United States Patent
Okamura et al.

(10) Patent No.: US 10,570,990 B2
(45) Date of Patent: Feb. 25, 2020

(54) ENDLESS FLAT BELT AND METHOD FOR MANUFACTURING THE SAME

(71) Applicant: NITTA CORPORATION, Osaka-shi, Osaka (JP)

(72) Inventors: Haruhide Okamura, Yamatokohriyama (JP); Yoshihiro Konishi, Yamatokohriyama (JP); Mitsuaki Ono, Yamatokohriyama (JP); Naomichi Nakai, Yamatokohriyama (JP); Naoki Kai, Yamatokohriyama (JP)

(73) Assignee: NITTA CORPORATION, Osaka-shi, Osaka (JP)

( * ) Notice: Subject to any disclaimer, the term of this patent is extended or adjusted under 35 U.S.C. 154(b) by 274 days.

(21) Appl. No.: 15/311,304

(22) PCT Filed: May 14, 2015

(86) PCT No.: PCT/JP2015/063856
§ 371 (c)(1),
(2) Date: Nov. 15, 2016

(87) PCT Pub. No.: WO2015/174480
PCT Pub. Date: Nov. 19, 2015

(65) Prior Publication Data
US 2017/0074350 A1    Mar. 16, 2017

(30) Foreign Application Priority Data
May 16, 2014 (JP) .................. 2014-102200

(51) Int. Cl.
*F16G 1/10* (2006.01)
*B29D 29/00* (2006.01)
(Continued)

(52) U.S. Cl.
CPC ............... *F16G 1/10* (2013.01); *B29D 29/00* (2013.01); *B32B 25/02* (2013.01); *B32B 25/10* (2013.01);
(Continued)

(58) Field of Classification Search
CPC ... F16G 1/10; F16G 1/08; B32B 25/10; B32B 25/02; B32B 2377/00; B32B 2433/04; B29D 29/00; B29K 2277/00
See application file for complete search history.

(56) References Cited

U.S. PATENT DOCUMENTS 6,220,983 B1 * 4/2001 Osako ................. D02G 3/18
474/205
2009/0042684 A1  2/2009 Takahashi et al.
(Continued)

FOREIGN PATENT DOCUMENTS

EP    2871387 A1    5/2015
FR    2600589 A1    12/1987
(Continued)

OTHER PUBLICATIONS

Machine Translation of JP 2009242007A (Year: 2009).*
(Continued)

*Primary Examiner* — James C Yager
(74) *Attorney, Agent, or Firm* — Millen, White, Zelano & Branigan, P.C.; William Nixon (57) ABSTRACT

An endless flat belt includes an inner rubber layer 1, a cord core 11 buried in the inner rubber layer 1 and spirally wound at a predetermined pitch in a width direction of the belt, and a reinforcement fabric 2 stuck to the inner rubber layer 1. The cord core comprises polyamide fiber. Opposite ends of the reinforcement fabric 2 are connected with each other into an endless form by adhesion or sewing. A surface rubber layer 3 is stuck to a surface of the reinforcement fabric 2 which is opposite a surface thereof stuck to the inner rubber layer 1.

9 Claims, 7 Drawing Sheets

(51) Int. Cl.
  *F16G 1/08* (2006.01)
  *B32B 25/02* (2006.01)
  *B32B 25/10* (2006.01)
  *B29K 277/00* (2006.01)

(52) U.S. Cl.
  CPC ............ *F16G 1/08* (2013.01); *B29K 2277/00* (2013.01); *B32B 2377/00* (2013.01); *B32B 2433/04* (2013.01); *Y10T 428/1362* (2015.01)

(56) References Cited

U.S. PATENT DOCUMENTS

| | | |
|---|---|---|
| 2011/0003659 A1 | 1/2011 | Wu et al. |
| 2015/0148165 A1 | 5/2015 | Matsuda |

FOREIGN PATENT DOCUMENTS

| | | |
|---|---|---|
| JP | 63-001948 U1 | 1/1988 |
| JP | 6-27865 Y2 | 7/1994 |
| JP | 2002-11801 A | 1/2002 |
| JP | 2005-314850 A | 11/2005 |
| JP | 2006-212850 A | 8/2006 |
| JP | 2009242007 A * | 10/2009 |
| JP | 2012-532289 A | 12/2012 |
| JP | 2013-180832 A | 9/2013 |
| WO | 2006/082702 A1 | 8/2006 |
| WO | 2011/003090 A1 | 1/2011 |
| WO | 2014/006916 A1 | 1/2014 |

OTHER PUBLICATIONS

International Search Report dated Jul. 21, 2015 issued in corresponding PCT/JP2015/063856 application (2 pages).
English Abstract of FR 2600589 A1 published Dec. 31, 1987.
English Machine Translation of JP 63-001948 U1 published Jan. 8, 1988.
English Abstract of JP 2002-011801 A published Jan. 15, 2002.
English Abstract of JP 2005-314850 A published Nov. 10, 2005.
English Abstract of JP 2013-180832 A published Sep. 12, 2013.

* cited by examiner

| | | Example 3 | Example 4 | Example 5 | Comparative Example 2 |
|---|---|---|---|---|---|
| Module of Elasticity in Tension (Mpa) | Code core | 34 | 25 | 39 | — |
| | Code film | — | — | — | 150 |
| | Circumferencial direction of reinforcement fabric | 0.018 | 0.018 | 0.018 | 6 |
| | Width direction of reinforcement fabric | 28 | 28 | 28 | 8 |
| Attached belt tension (N/mm) | | 44 | 43 | 47 | 45 |
| Pressure distribution | |  |  |  |  |

Fig. 14

ENDLESS FLAT BELT AND METHOD FOR MANUFACTURING THE SAME

TECHNICAL FIELD

The present invention relates to an endless flat belt used for the purposes of twist travel, such as a paper tube winding belt, and to a method for manufacturing the endless flat belt.

BACKGROUND ART

A flat belt conventionally used as a high-speed transmission belt is generally made into an endless belt by processing opposite ends of a band-shaped belt having a polyamide film as a core body into a joint shape, such as a skiver joint and a finger joint, followed by integrally adhering with an adhesive or thermal adhesion.

However, because the adhesive usually has poor flexibility, the belt may be partially hardened at a joint part and stress concentration is apt to occur at the hardened portion, and consequently the durability, particularly bending resistance of the belt is apt to deteriorate. Cracks can occur at the joint part in a short period of time. In some cases, the belt can be broken.

Figure 14:
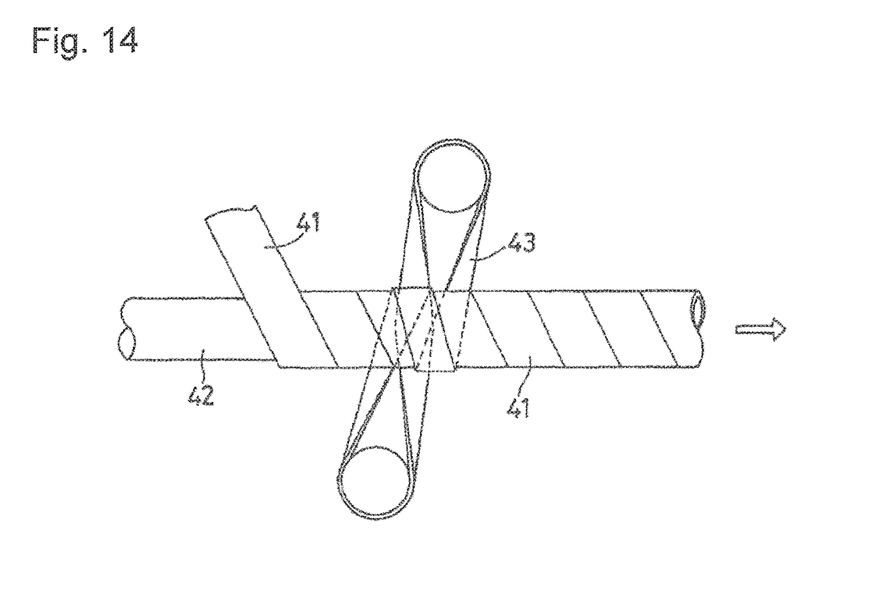
FIG. 14 is a schematic diagram that shows an embodiment of a paper tube manufacturing.

When manufacturing a paper tube, the paper tube is manufactured by spirally winding a paper tape 41 around a mandrel 42 as shown in FIG. 14. The paper tape 41 wound around the mandrel 42 is transported in an axial direction by a flat belt 43 (Patent Document 1). The flat belt 43 is to be strongly twisted and functions to perform pressure contact and delivery of base paper of the paper tube with an adhesive applied thereto.

Thus, the flat belt 43 used for manufacturing the paper tube is wound around the paper tape while being strongly twisted, and travels at high speed while performing the pressure contact. Therefore, a middle part of the belt and a side end part thereof differ from each other in elongation rate, specifically the side end part has a larger elongation rate than the middle part, and consequently the joint part may break under load.

The flat belt used for manufacturing the paper tube needs to be wound around the paper tube at a certain angle and travel while being pressure contacted to the paper tube. Hence, uneven winding pressure is apt to occur. When high pressure contact is performed by further increasing the tension of the belt in order to eliminate the uneven winding pressure, the belt has shorter service life due to uneven wear, and the belt may break in some cases. Additionally, the increased tension of the belt increases load on a mechanical side and, for example, the belt is strongly wound around the mandrel for winding the paper tape, thus leading to an early wear of the mandrel. The paper tube of poor quality may occur, or the mandrel may need to be replaced in a short period of time. Furthermore, the strong winding of the belt increases power consumption, thereby increasing running costs. Even when the belt is merely softened to improve winding performance, deformation volume of the belt may increase because the belt is strongly twisted. Consequently, uneven wear may occur due to friction between the belts, resulting in short service life.

Meanwhile there is an endless flat belt without any joint part. According to a conventional method therefor, opposite ends of a reinforcement fabric are jointed together and overlaid on an outer surface of a cylindrical metal mold corresponding to a belt size, a cord core is wound around the reinforcement fabric, and a rubber sheet or the like is overlaid thereon, followed by vulcanization molding. The endless flat belt has the advantages that the belt has no joint therein and has excellent bending resistance.

However, when the endless flat belt is used for the purpose of a twist travel, such as the paper tube winding machine as described above, due to the difference in elongation rate between the middle part and the side end part of the belt, the side end part elongates farther than the middle part, so-called one-sided elongation occurs, and the belt is apt to be wavily deformed. Upon the occurrence of the one-sided elongation, it is difficult to uniformly apply a tension in a width direction of the belt. There are the problems that a winding force of the paper tube onto the base paper becomes uneven, and the travel of the belt becomes unstable.

As a method for manufacturing the endless flat belt, materials are laminated one upon another on an outer surface of a cylindrical metal mold and are then subjected to belt molding. Therefore, a circumferential length of the belt depends on a circumferential length of the metal mold, and there is the need to have the cylindrical metal mold for each circumferential length. Patent Documents 2 and 3 respectively disclose endless belts in which a tubular flat knitted fabric (circular knitted fabric) is entrained in a stretched state between two rolls, and a cord core is wound at a constant pitch in the width direction of the belt and adhered integrally. The above problems cannot occur because there is no joint part of the reinforcement fabric. With this method, it is, however, difficult to manufacture various endless flat belts that differ in length because the circumferential length of the belt is determined by the circumferential length of the tubular flat knitted fabric to be used. Particularly, it is difficult to manufacture a belt having a large circumferential length.

Meanwhile, for example, for the purpose of the paper tube winding machine whose circumferential length is as long as approximately 7-9 m, there is a demand for a belt free from any joint and the one-side elongation.

PRIOR ART DOCUMENTS

Patent Documents

Patent Document 1: Japanese Examined Utility Model Application Publication No. 6-27865;
Patent Document 2: Japanese Unexamined Patent Publication No. 2005-314850; and
Patent Document 3: Japanese Unexamined Patent Publication No. 2013-180832

SUMMARY OF THE INVENTION

Problems to be Solved by the Invention

A major object of the present invention is to provide an endless flat belt configured to stabilize the tension of the belt and travel performance of the belt by inhibiting the break and one-sided elongation due to load exerted on a side end part of the belt during a twist travel of the belt.

Another object of the present invention is to provide an endless flat belt capable of inhibiting poor adhesion due to uneven pressure during the pressure contact of the belt, and inhibiting the short service life of the belt due to high load on a machine, an increased amount of wear of the belt, and the break of the belt which can be caused by the high pressure contact for eliminating the uneven pressure.

Still another object of the present invention is to provide a method for manufacturing an endless flat belt with which it is easy to manufacture the belt having a large circumferential length without using any cylindrical metal mold.

Means for Solving the Problems

The present inventors have earnestly investigated for solving the above problems and consequently have reached the present invention.

An endless flat belt according to one embodiment of the present invention includes an inner rubber layer, a cord core buried in the inner rubber layer and spirally wound at a predetermined pitch in a width direction of the belt, and a reinforcement fabric stuck to the inner rubber layer. The cord core is composed of polyamide fiber. Opposite ends of the reinforcement fabric are connected with each other into an endless form by adhesion or sewing. The flat belt is employed, for example, for the purpose of travel in a twisted state.

An endless flat belt according to another embodiment of the present invention includes an inner rubber layer, a cord core buried in the inner rubber layer and spirally wound at a predetermined pitch in a width direction of the belt, and a reinforcement fabric stuck to the inner rubber layer. A modulus of elasticity in tension of the cord core is 10-200 MPa, a modulus of elasticity in tension of the reinforcement fabric in a circumferential direction of the belt is 0.001-5 MPa, and a modulus of elasticity in tension of the reinforcement fabric in the width direction of the belt is 10 MPa or more.

A method for manufacturing an endless flat belt according to one embodiment of the present invention includes the step of forming an inner rubber layer on a surface of a reinforcement fabric by sticking a rubber sheet to the surface of the reinforcement fabric, or by coating liquid rubber onto the surface of the reinforcement fabric, followed by drying, the step of adhering or sewing together opposite ends of the reinforcement fabric into an endless form, the step of obtaining a laminate body of the reinforcement fabric and the inner rubber layer by spirally winding a cord core around the surface of the reinforcement fabric being in the endless form at a predetermined pitch in a width direction of the reinforcement fabric, and burying the cord core in the inner rubber layer, and the step of carrying out vulcanization molding of the laminate body by applying heat and pressure thereto. The cord core is composed of polyamide fiber.

A method for manufacturing an endless flat belt according to another embodiment of the present invention includes the step of forming an inner rubber layer on a surface of a reinforcement fabric by sticking a rubber sheet to the surface of the reinforcement fabric, or by coating liquid rubber onto the surface of the reinforcement fabric, followed by drying, the step of connecting opposite ends of the reinforcement fabric with each other into an endless form, the step of obtaining a laminate body of the reinforcement fabric and the inner rubber layer by spirally winding a cord core around the surface of the reinforcement fabric brought into the endless state at a predetermined pitch in the width direction of the reinforcement fabric, and burying the cord core in the inner rubber layer, and the step of carrying out vulcanization molding of the laminate body by applying heat and pressure thereto. A modulus of elasticity in tension of the cord core is 10-200 MPa. A modulus of elasticity in tension of the reinforcement fabric in the circumferential direction of the belt is 0.001-5 MPa. A modulus of elasticity in tension of the reinforcement fabric in the width direction of the belt is 10 MPa or more.

Effects of the Invention

With the endless flat belt according to the one embodiment of the present invention, the polyamide fiber is used for the cord core buried in the inner rubber layer. This contributes to inhibiting the break and one-sided elongation of the belt due to load exerted on the side end part of the belt during the twist travel. It is consequently possible to stabilize the tension and travel performance of the belt, thus leading to longer service life of the belt.

With the endless flat belt according to the another embodiment of the present invention, the modulus of elasticity in tension of the cord core is 10-200 MPa, the modulus of elasticity in tension of the reinforcement fabric in the circumferential direction of the belt is 0.001-5 MPa, and the modulus of elasticity in tension of the reinforcement fabric in the width direction of the belt is 10 MPa or more. Hence, for the purpose of causing the belt to run while being twisted and wound, such as a paper tube winding belt, winding pressure can be equalized while retaining rigidity in the width direction of the belt against the twist. This ensures a stable run of the belt even at a low tension, and also achieves longer service life of the belt and power saving.

With the method for manufacturing the endless flat belt, the opposite ends of the reinforcement fabric are made into the endless form in advance. This allows for free design of the circumferential length of the belt without using any cylindrical metal mold that has conventionally been used. It is easy to manufacture a belt having a large circumferential length.

BRIEF DESCRIPTION OF THE DRAWINGS

FIGS. 7(a) to 7(e) are perspective views that respectively show other joint shapes of the reinforcement fabric in the present invention;

EMBODIMENTS FOR CARRYING OUT THE INVENTION

Figure 1:
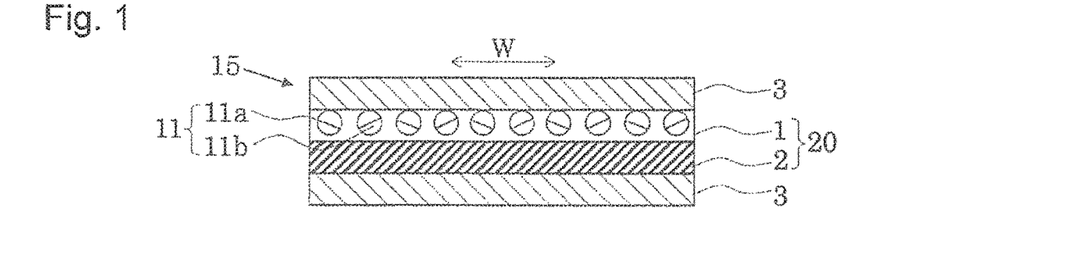
FIG. 1 is a schematic cross-sectional view that shows an endless flat belt according to one embodiment of the present invention.

An endless flat belt according to one embodiment of the present invention is described below with reference to FIG. 1. The endless flat belt 15 shown in FIG. 1 is made up of an inner rubber layer 1 having a cord core 11 buried therein which is wound spirally at a predetermined pitch in a width direction of the endless flat belt 15 (indicated by arrow W), a reinforcement fabric 2 stuck to one surface of the inner rubber layer 1, and surface rubber layers 3 respectively stuck to the other surface of the inner rubber layer 1 to which the reinforcement fabric 2 is not stuck, and to a surface of the reinforcement fabric 2 which is opposite a surface thereof stuck to the inner rubber layer 1.

Figure 2:
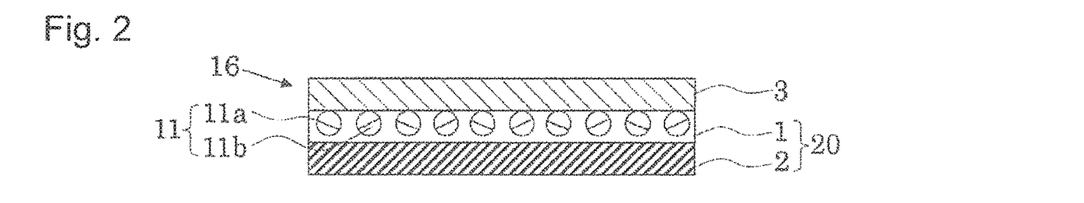
FIG. 2 is a schematic cross-sectional view that shows an endless flat belt according to another embodiment of the present invention.

An endless flat belt 16 shown in FIG. 2 has a structure similar to that of the endless flat belt 15 except that the surface rubber layer 3 is stuck only to one surface of the inner rubber layer 1.

Figure 3:
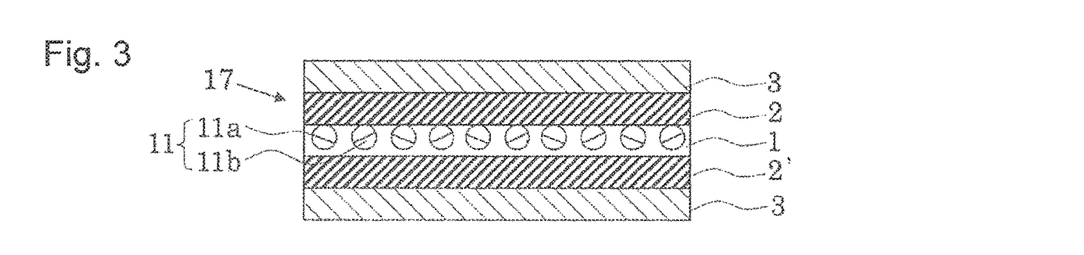
FIG. 3 is a schematic cross-sectional view that shows an endless flat belt according to still another embodiment of the present invention.

An endless flat belt 17 shown in FIG. 3 has a structure similar to that of the endless flat belt 15 except that reinforcement fabrics 2 and 2' are respectively stuck to both surfaces of the inner rubber layer 1 having the cord core 11 buried therein, and that the surface rubber layer 3 is stuck to one surface of each of the reinforcement fabrics 2 which is opposite the inner rubber layer 1. In this embodiment, the reinforcement fabrics 2 and 2' and the surface layers 3 are laminated one upon another on both surfaces of the inner rubber layer 1 having the cord core 11 buried therein so as to have symmetry around the cord core 11.

(Inner Rubber Layer 1)

The inner rubber layer 1 is formed by sticking a rubber sheet on one surface of the reinforcement fabric 2, or applying liquid rubber to a surface of the reinforcement fabric 2, followed by drying. Subsequently, the cord core 11 is buried in the inner rubber layer 1.

A material of the inner rubber layer 1 is, for example, at least one kind selected from the group consisting of nitrile rubber, carboxylated nitrile rubber, hydrogenated nitrile rubber, chloroprene rubber, chlorosulfonated polyethylene, polybutadiene rubber, natural rubber, EPM, EPDM, urethane rubber, and acrylic rubber. The inner rubber layer 1 preferably has a thickness of 0.1-2.0 mm.

(Cord Core 11)

The cord core 11 is buried in the inner rubber layer 1 in the length direction of the belt. The cord core 11 is wound spirally at a predetermined pitch in the width direction of the belt. In order to inhibit skewing during the travel of the belt, the cord core 11 is preferably configured so that an S-twisted cord core 11a and a Z-twisted cord core 11b are arranged alternately.

As a material of the cord core 11, a polyamide fiber is used. Examples of the polyamide fiber include polyamide 6, polyamide 66, polyamide 46, polyamide 11, polyamide 12, and polyamide 610. The reason for using the polyamide fiber as the material of the cord core 11 is that the polyamide fiber has a lower permanent elongation than other fibers and is therefore suitable for inhibiting the one-side elongation and break under the load exerted on the side end part of the belt during the twist travel.

Examples of the cord core 11 include thread composed of long fiber of polyamide, and twisted yarn having long fibers or short fibers of polyamide uniformly arranged and stranded. In the case of the latter twisted yarn, the cord core 11 needs to be substantially composed of polyamide fiber, and may contain other fiber, such as polyester fiber, in such a range as not to impair performance of the polyamide fiber. The cord core 11, as the twisted yarn having long fibers or short fibers uniformly arranged and stranded, usually has a thickness of 470-25200 dtex, preferably 880-18800 dtex.

(Reinforcement Fabric 2)

The reinforcement fabric 2 is for imparting durability to the belt. The reinforcement fabric 2 is stuck to at least one surface of the inner rubber layer 1. Examples of the material of the reinforcement fabric 2 include woven fabrics and knitted fabrics of polyester fiber, polyamide fiber, aramid fiber, glass fiber, carbon fiber, and cotton. As described later, opposite ends of at least one surface of the reinforcement fabric 2 are connected with each other by a finger joint or the like.

(Surface Rubber Layer 3)

The surface rubber layer 3 is preferably one which is suitable for friction transmission by having stable transfer capacity between the endless flat belt 15 and a transport object or a power transmission apparatus on the surface of the belt 15 Examples of the material of the surface rubber layer 3 include nitrile rubber, carboxylated nitrile rubber, hydrogenated nitrile rubber, chloroprene rubber, chlorosulfonated polyethylene, polybutadiene rubber, natural rubber, EPM, EPDM, urethane rubber, acrylic rubber, and silicone rubber. The surface rubber layer 3 has a thickness of 0.1-10 mm, preferably 0.1-5 mm, more preferably 0.2-3 mm.

In order to prevent a decrease in coefficient of friction with respect to the transport object, the surface rubber layer 3 may have, on a surface thereof, a micro concave-convex shaped pattern (so-called pattern shaped by dressing).

Although the pattern provided on the surface of the surface rubber layer 3 is formable during vulcanization molding, the pattern may be formed before or after the vulcanization. The pattern is formable, for example, with the following method. A fabric pattern material is mounted on the surface of the surface rubber layer 3 in an unvulcanized state, and subsequently the fabric pattern material is strongly pressed against the surface of the surface rubber layer 3 by vulcanization under pressure. The vulcanization is allowed to proceed as it is, and the fabric pattern material is then peeled away after termination of the vulcanization, thereby leaving the concave-convex of the fabric pattern on the surface of the surface rubber layer 3.

A method for manufacturing the endless flat belt according to the present invention is described in detail below with reference to the drawings.

Figure 4:
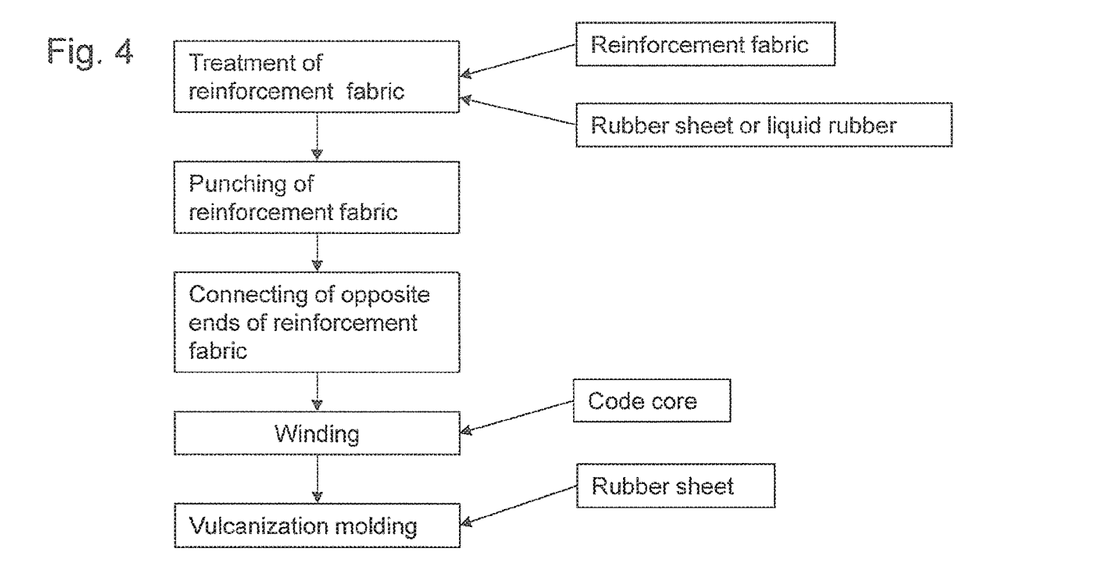
FIG. 4 is a flowchart that describes an embodiment of a manufacturing method according to the present invention.

As shown in FIG. 4, the method for manufacturing the endless flat belt 15 according to an embodiment of the present invention includes the following steps (I) to (V), and is carried out in the order from the step (I) to the step (V):

(I) the reinforcement fabric treatment step of sticking a rubber sheet onto the reinforcement fabric 2, or applying liquid rubber to the reinforcement fabric 2, followed by drying;

(II) the step of punching the reinforcement fabric 2 in order to form, on opposite end parts thereof, a convex part and a concave part that correspond to each other;

(III) the step of connecting opposite ends of the reinforcement fabric 2 with each other into an endless form;

(IV) the winding step of obtaining a laminate body by winding the cord core 11 around the surface of the reinforcement fabric 2 being in the endless form; and (V) the step of carrying out vulcanization molding by applying heat and pressure to the laminate body.

<Step (I)>

Figure 5A:
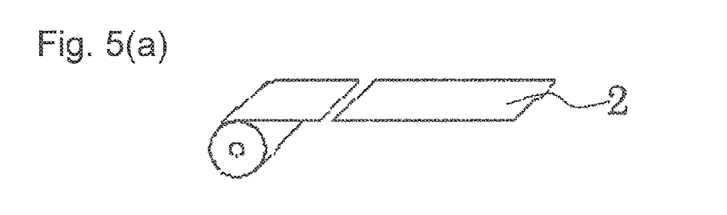
FIGS. 5(a) to 5(c) are explanatory drawings that describe the step of connecting a reinforcement fabric in the present invention.

As shown in FIG. 5(a), after sticking the rubber sheet to the surface of the band-shaped reinforcement fabric 2, or applying the liquid rubber thereto, followed by drying, this is then cut to a predetermined length. The sticking of the rubber sheet may be carried out with the use of an adhesive or adhesion by application of heat and pressure. The thickness of the rubber sheet to be used, or the amount of application of the liquid rubber is controlled according to the thickness of the inner rubber layer 2 to be formed.

<Step (II)>

Figure 5B:
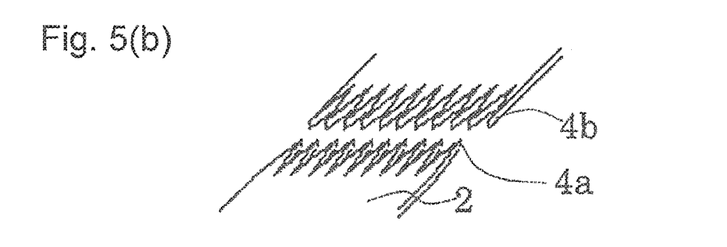

As shown in FIG. 5(b), punching of the reinforcement fabric is carried out to form the convex parts 4a and the concave parts 46 in a so-called finger joint shape 4 configured to engage and connect the concave and convex parts on opposite end surfaces of the reinforcement fabric 2 with each other. In the finger joint shape 4, a plurality of the convex parts 4a having approximately isosceles triangle and protruding in the longitudinal direction of the belt are continuously formed into a serrated shape in the width direction at one end of the reinforcement fabric 2. The finger joint shape 4 has, on the other end thereof, the concave parts 4b having a shape corresponding to the convex parts 4a.

Figure 6:
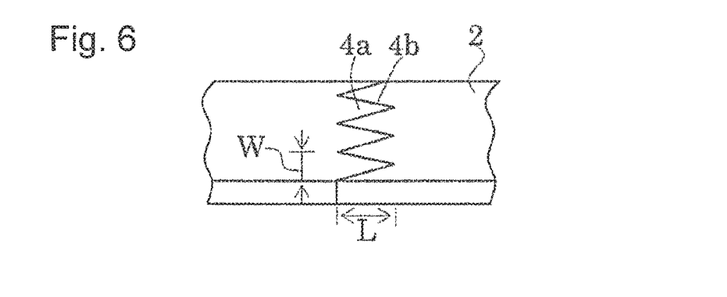
FIG. 6 is a perspective view that shows a joint part shape of the reinforcement fabric in the present invention.

FIG. 6 shows the joint shape so connected with each other. A width W of the convex parts 4a and the concave parts 4b shown in FIG. 6 is normally 5-100 mm, preferably 10-30 mm, and a length L thereof is normally 10-200 mm, preferably 50-150 mm.

Figure 7A:
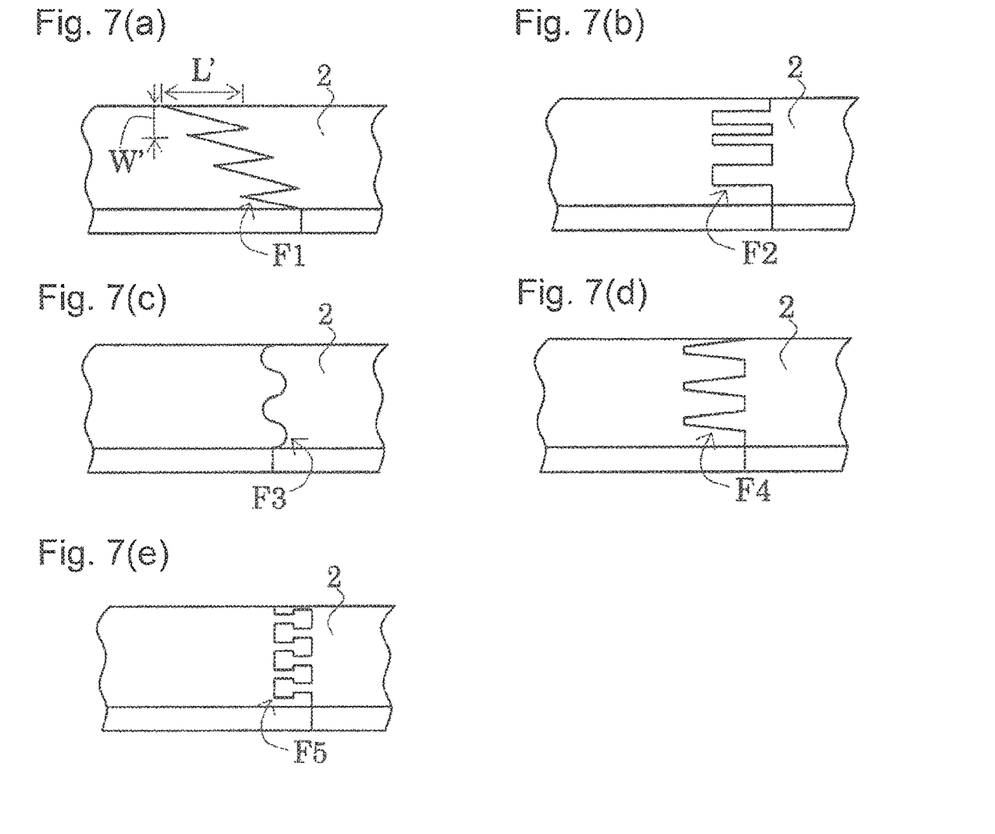

In the finger joint shape shown in FIG. 6, the joint is orthogonal to the length direction of the reinforcement fabric 2. Alternatively, the joint may have a finger joint shape (indicated by arrow F1) that is inclined relative to the length direction of the reinforcement fabric 2 as shown in FIG. 7(a). In the finger joint shape, the convex parts 4a and the concave parts 4b may have a concave-convex shape other than the serrated shape, such as a square, approximately semi-circular shape, trapezoid, and convex shape as indicated by arrows F2 to F5 in FIGS. 7(b) to 7(e).

Although the punching is employed as the method for forming the finger joint shape 4 on the reinforcement fabric 2, a cutting process may be employed therefor.

<Step (III)>

Figure 5C:
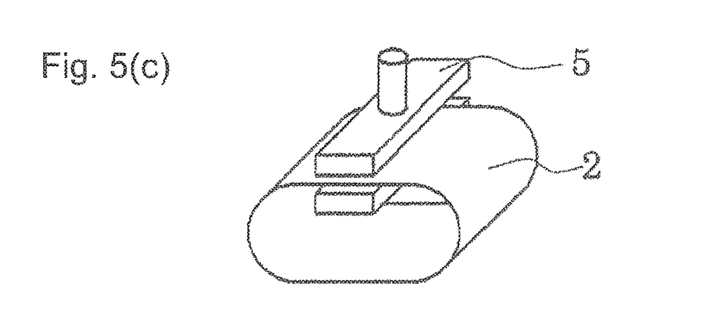

As shown in FIG. 5(c), using a press machine 5, heat and pressure are applied to the joint parts of the reinforcement fabric 2 engaged with each other through the finger joint shape 4, thereby connecting the opposite ends with each other into an endless state.

Figure 8:
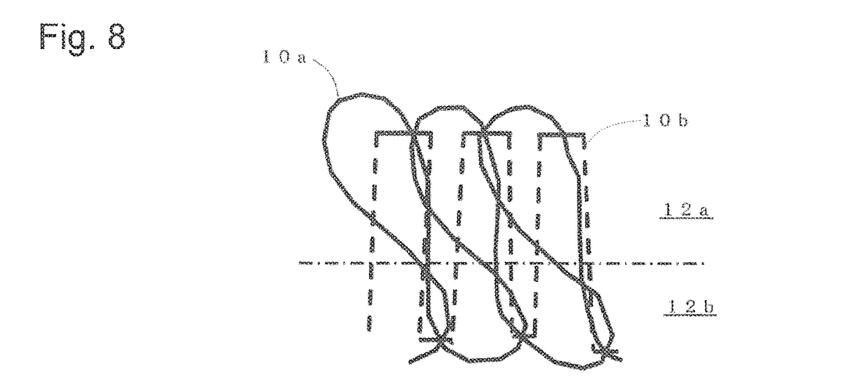
FIG. 8 is an explanatory drawing that shows a joint shape obtained by sewing the reinforcement fabric with a thread.

Instead of the connection, opposite ends 12a and 12b of the reinforcement fabric 2 may be sewn together with threads 10a and 10b as shown in FIG. 8. FIG. 8 shows a sewn state by a sewing machine, in which one is an upper thread 10a and the other is a lower thread 10b. The opposite ends 12a and 12b of the reinforcement fabric 2 can be tightly connected with each other by tangling these threads 10a and 10b. A part of the lower thread 10b, which is invisible because of being located on the rear side of the reinforcement fabric 2, is indicated by a broken line. The opposite ends 12a and 12b of the reinforcement fabric 2 are sewn together in abutment against each other as indicated by a long dashed short dashed line in FIG. 8 or, alternatively may be sewn together with a clearance interposed therebetween.

Still alternatively, the connection and the sewing may be employed together. For example, after the opposite ends 12a and 12b of the reinforcement fabric 2 are connected with each other as shown in FIG. 6 or 7, a connecting portion may be sewn together with the threads 10a and 10b as shown in FIG. 8.

<Step (IV)>

Figure 9:
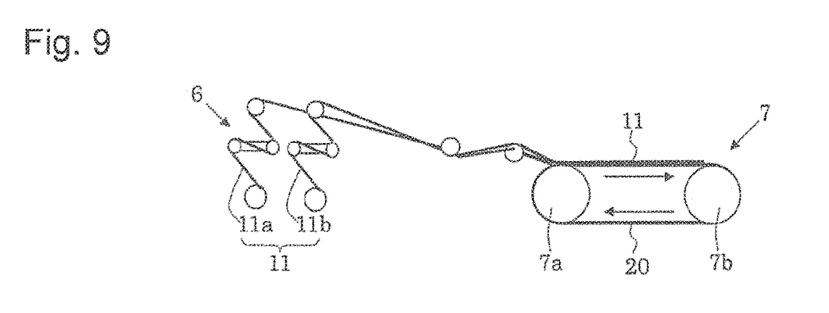
FIG. 9 is an explanatory drawing that shows the step of winding a cord core in the present invention.

As shown in FIG. 9, the cord core 11 whose tension is controlled by a cord tension controller 6 is spirally wound around at a predetermined pitch in the width direction of the reinforcement fabric 2, while applying an appropriate tension to the endless reinforcement fabric 2 being wound around a cord winding apparatus 7 made up of at least two shafts of a driver pulley 7a and a driven pulley 7b (a winding process). Consequently, the cord core 11 is wound onto the reinforcement fabric 2, thus obtaining a laminate body 20 made up of the reinforcement fabric 2, the inner rubber layer 1, and the cord core 11. The laminate body 20 may be configured to have the reinforcement fabric 2 formed on both surfaces of the inner rubber layer 1.

The cord core 11 is preferably configured so that the S-twisted cord core 11a and the Z-twisted cord core 11b are arranged alternately in the width direction of the reinforcement fabric 2 in order to prevent the skewing of the belt.

When the endless reinforcement fabric 2 has a large circumferential length, it is necessary to make a stroke longer by disposing one guide roller or two or more guide rollers (not shown) between the driver pulley 7a and the driven pulley 7b of the cord winding apparatus 7.

<Step (V)>

A sheet-shaped rubber material for forming the surface rubber layer 3 is laminated on both surfaces of the laminate body 20, and heat and pressure are applied thereto to simultaneously carry out vulcanization molding of the inner rubber layer 1 and the surface rubber layer 3. The lamination of the rubber material and the vulcanization molding may be carried out continuously. Thus, the endless flat belt 15 shown in FIG. 1 is obtainable.

The endless flat belt 16 shown in FIG. 2 is obtainable by laminating the sheet-shaped rubber material for forming the surface rubber layer 3 only on one surface of the laminate body 20, followed by application of heat and pressure.

The endless flat belt 17 shown in FIG. 3 is obtainable by spirally winding the cord core 11 at a predetermined pitch in the width direction of the reinforcement fabric 2, then sticking another reinforcement fabric 2' to the surface of the inner rubber layer 1 being opposite the surface to which the reinforcement fabric 2 is stuck, and subsequently forming the surface rubber layer 3 on the outer surfaces of the reinforcement fabrics 2 and 2' in the step (IV) shown in FIG. 9.

Another embodiment of the present invention is described below. An endless flat belt according to the present embodiment is similar to that of the foregoing embodiment except that the modulus of elasticity in tension of the cord core is 10-200 MPa, the modulus of elasticity in tension of the reinforcement fabric in the circumferential direction of the belt is 0.001-5 MPa, and the modulus of elasticity in tension of the reinforcement fabric in the width direction of the belt is 10 MPa or more.

The modulus of elasticity in tension of the cord core is 10-200 MPa, preferably 20-100 MPa. When the modulus of elasticity in tension of the cord core 11 falls in the above range, the circumferential elongation of the belt can be inhibited, and the belt has excellent durability against the twist travel. In contrast, when the modulus of elasticity in tension of the cord core 11 is lower than the above range, the tension of the belt is deteriorated, making it difficult to satisfy transfer capacity to deliver, for example, the paper tube. In contrast, when exceeding the above range, there occurs an increase in the difference of tension in the width direction of the belt due to a twist, and hence winding pressure becomes uneven. It is therefore difficult to ensure satisfactory pressure contact, thus necessitating a high pressure contact. This causes an undesirable event that a difference of permanent elongation in the width direction of the belt is apt to occur in a short period of time, leading to a poor pressure contact.

The cord core 11, as the twisted yarn having long fibers or short fibers uniformly arranged and stranded, usually has a thickness of 470-25200 dtex, preferably 880-18800 dtex.

As the cord core, for example, fibers of polyamide (PA), polybutylene terephthalate (PBT), polytrimethylene terephthalate (PTT), and vinylon are used alone or in combination. The polyamide fiber is also formable by blending with polyamide 6, polyamide 66, polyamide 46, polyamide 11, polyamide 12, polyamide 610, polyamide fibers of copolymers of these, and other polymers. The fibers of PBT, PTT, or vinylon are also blendable with other material. The fibers of PA, PBT, PTT, or vinylon may contain other fiber to the extent that it does not impair the performance.

As the cord core, for example, a thread composed of long fibers, or a twisted yarn having long fibers or short fibers uniformly arranged and stranded is used.

The modulus of elasticity in tension of the reinforcement fabric in the circumferential direction of the belt is 0.001-5 MPa, preferably 0.01-3 MPa. The modulus of elasticity in tension of the reinforcement fabric 2 in the width direction of the belt is 10 MPa or more, preferably 20-100 MPa. Thus, the reinforcement fabric has elasticity in the circumferential direction of the belt and retains rigidity in the width direction of the belt against the twist, thereby contributing to equalization of winding pressure.

In order to impart the elasticity indicated by the modulus of elasticity in tension of the reinforcement fabric in the circumferential direction of the belt, for example, a processed thread is used in the circumferential direction of the belt. The processed thread is generally thread to which elasticity and bulkiness are imparted by applying fine crimps to a filament thread, and then fixing the crimps by heat treatment. As the material thereof, it is possible to use fiber threads of polyester, polybutylene terephthalate (PBT), polyamide, or the like. As other thread material having elasticity, for example, urethane elastic thread, polyetherester based highly elastic thread, polybutylene terephthalate (PBT), and polytrimethylene terephthalate (PTT) are usable as a covered yarn.

A material of the reinforcement fabric 2, which imparts the modulus of elasticity in tension to the width direction of the belt, is composed of, for example, at least one material selected from the group consisting of polyamide fiber, aramid fiber, polyester fiber, glass fiber, cotton thread, vinylon fiber, and polyketone fiber. A filament thread of these fibers is used with no crimp or a slight crimp applied thereto.

EXAMPLES

The endless flat belt and the method for manufacturing the endless flat belt according to the present invention are described below by giving examples, however, the present invention is not limited thereto.

Example 1

After sticking a nitrile rubber sheet with a thickness of 0.4 mm to a polyester canvas (reinforcement fabric) (refer to FIG. 5(*a*)), this was subjected to punching into a sawtooth shape, thereby separately forming convex parts and concave parts (refer to FIG. 5(*b*)). The convex parts were respectively disposed inside the concave parts and pressed at 100° C. (refer to FIG. 5(*c*)) into an endless canvas connected with each other through a finger joint shape with a width W of 15 mm and a length L of 70 mm as shown in FIG. 6.

Subsequently, the endless canvas was wound around the driver pulley 7a and the driven pulley 7b of the cord winding apparatus 7 as shown in FIG. 9. A twisted yarn obtained by uniformly arranging polyamide 46 of 470 dtex and then twisting up to 5600 dtex was used as a cord core. The cord core was spirally buried in the nitrile rubber sheet in the endless canvas while controlling the tension of the cord core by the tension control apparatus. Thereafter, a polyamide canvas (reinforcement fabric) was wound around an outer surface, thereby obtaining a laminate body.

Subsequently, a sheet of carboxylated nitrile rubber was stuck to both surfaces of the laminate body, followed by vulcanization molding, resulting in the endless flat belt having the structure shown in FIG. 3 and having a thickness of 3.2 mm and a circumferential length of 1500 mm.

Example 2

An endless flat belt having the structure shown in FIG. 3 and having a thickness of 3.2 mm and a circumferential length of 1500 mm was obtained in the same manner as in Example 1, except that polyamide 66 fabric of 5600 dtex was used as a cord core.

Example 3

An endless flat belt having the structure shown in FIG. 3 and having a thickness of 3.2 mm and a circumferential length of 1500 mm was obtained in the same manner as in Example 2, except that opposite ends of a polyester canvas (reinforcement fabric) were sewn together in abutment against each other as shown in FIG. 8.

Comparative Example 1

An endless flat belt having the structure shown in FIG. 3 and having a thickness of 3.2 mm and a circumferential length of 1500 mm was obtained in the same manner as in Example 1, except that a polyester fabric of 5000 dtex was used as a cord core.

<Twist Travel Test>

The endless flat belt was twisted 360° and wound around the driver pulley and the driven pulley, each having a diameter of φ150 mm, under environment of 23° C. and 54% RH. An elongation rate during attachment was 2% at a middle part and 3% at a side end part in the width direction of the belt. Then, after a travel at 700 m/min for 70 hours, a difference between permanent elongation at the middle part of the belt and that at the side end part thereof was measured. A one-side elongation state after the travel was evaluated from an external observation of the belt.

The permanent elongation (%) was obtained from the following equation.

$$[\{(\text{Circumferential length of belt after travel})-(\text{Circumferential length of belt before travel})\}/(\text{Circumferential length of belt before travel})]\times 100$$

The test results are presented in Table 1.

TABLE 1

| | Code core | Appearance of belt (State of middle part and side end part) | *Difference of permanennt elongation (%) |
|---|---|---|---|
| Example 1 | polyamide 46 | No difference between the middle part and side end part is observed | 0.06 |
| Example 2 | polyamide 66 | No difference between the middle part and side end part is observed | 0.08 |
| Example 3 | polyamide 66 | No difference between the middle part and side end part is observed | 0.07 |
| Comparative example 1 | polyester | One-sided elongation of the side end part is observed | 0.25 |

*Difference of permanent elongation = (permanent elongation of side end part belt) − (permanent elongation of middle part of belt)

As presented in Table 1, the belt of Comparative Example 1 had a large difference in permanent elongation between the middle part and the side end part in the width of the belt in the twist travel test, and consequently causing one-sided elongation that the side end part was wavily deformed. In contrast, in the belts of Examples 1 to 3, the difference in permanent elongation between the middle part and the side end part in the width of belt was between ⅓ and ¼ of that of Comparative Example 1, and no one-sided elongation was observed.

Example 4

A canvas was used as a reinforcement fabric. Using long fiber of polyamide 66 as a material of the reinforcement fabric, the canvas was obtained by weaving at a yarn density of 71 pieces/25 mm of a processed thread of 220 dtex in the circumferential direction of the belt, and at a yarn density of 108 pieces/25 mm of a thread of 235 dtex in the width direction of the belt. Then, after sticking an NBR (nitrile butadiene rubber) sheet thereto, opposite ends of the canvas were abutted against each other and then pressed at 100° C. into an endless canvas.

Subsequently, the endless canvas was wound around the driver pulley 7a and the driven pulley 7b of the cord winding apparatus 7 as shown in FIG. 9. A twisted yarn obtained by uniformly arranging polyamide 66 of 2100 dtex and then twisting up to 12600 dtex was used as a cord core. The cord core was spirally buried in the NBR sheet of the endless canvas while controlling the tension of the cord core by the tension control apparatus. Thereafter, a polyamide canvas (reinforcement fabric) was wound around an outer surface, thereby obtaining a laminate body.

Subsequently, an NBR sheet with a thickness of 1 mm was stuck to both surfaces of the laminate body, followed by vulcanization molding, resulting in the endless flat belt having the structure shown in FIG. 3 and having a thickness of 4.6 mm and a circumferential length of 3300 mm.

Example 5

An endless flat belt having the structure having a thickness of 4.2 mm and a circumferential length of 3300 mm was obtained in the same manner as in Example 3, except that a thread obtained by uniformly arranging long fibers of polyamide 66 of 1400 dtex and then twisting up to 5600 dtex was used as a cord core.

Example 6

An endless flat belt having the structure having a thickness of 4.2 mm and a circumferential length of 3300 mm was obtained in the same manner as in Example 4, except that a thread obtained by uniformly arranging long fibers of polyamide 46 of 470 dtex and then twisting up to 5640 dtex was used as a cord core.

Comparative Example 2

An endless flat belt having a belt thickness of 4.0 mm, a width of 115 mm, and a circumferential length of 3300 mm was obtained by sequentially sticking a polyamide canvas and an NBR sheet on each of both surfaces of a polyamide film with a thickness of 2.0 mm, then carrying out vulcanization molding, and thereafter connecting opposite end parts with each other with an adhesive.

<Winding Pressure Contact Test>

Figure 10:
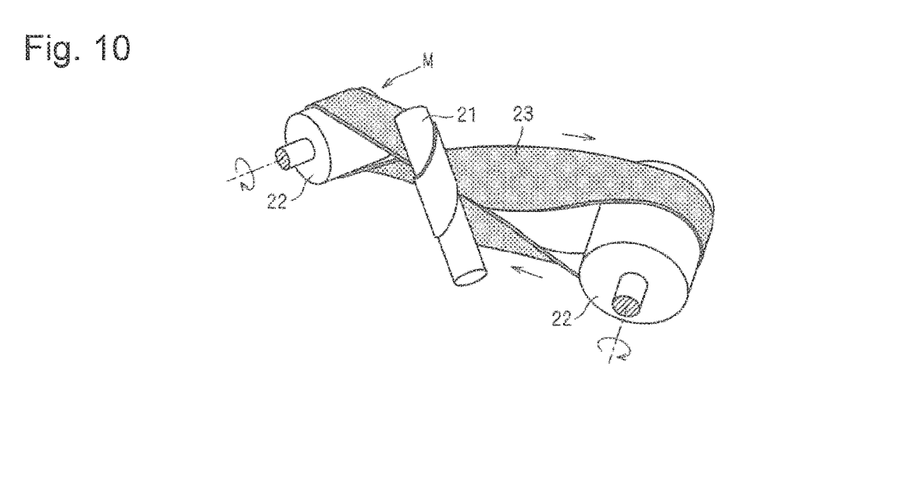
FIG. 10 is a schematic perspective view that shows a method of a belt winding pressure contact test in an embodiment.
Figure 11:
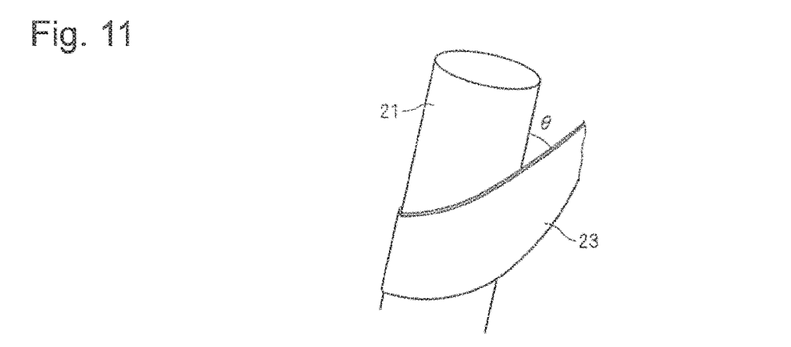
FIG. 11 is a schematic perspective view that shows a winding angle of the belt with respect to a pseudo paper tube in the belt winding pressure contact test.

As shown in FIG. 10, a pseudo paper tube 21 that was a resin tube having a diameter of 76.2 mm was disposed between a pair of pulleys 22 and 22 (200 mm in diameter), and the endless flat belt 23 was twisted and wound around the pseudo paper tube 21 and then entrained between the pulleys 22 and 22. Here, an insertion angle θ of the belt 23 with respect to the pseudo paper tube 21 was set to 60 degrees as shown in FIG. 11. In order to measure a distribution state of pressure exerted on pseudo paper tube 21 during the travel of the belt, a film-type pressure distribution measurement system I-SCAN (tactile sensor system, manufactured by NITTA CORPORATION) was wound around an outer circumferential surface of the pseudo paper tube 21. In this state, the flat belt 23 in a stationary state was pulled at room temperature, and a pressure distribution exerted on the pseudo paper tube 21 was measured.

Figure 12A:
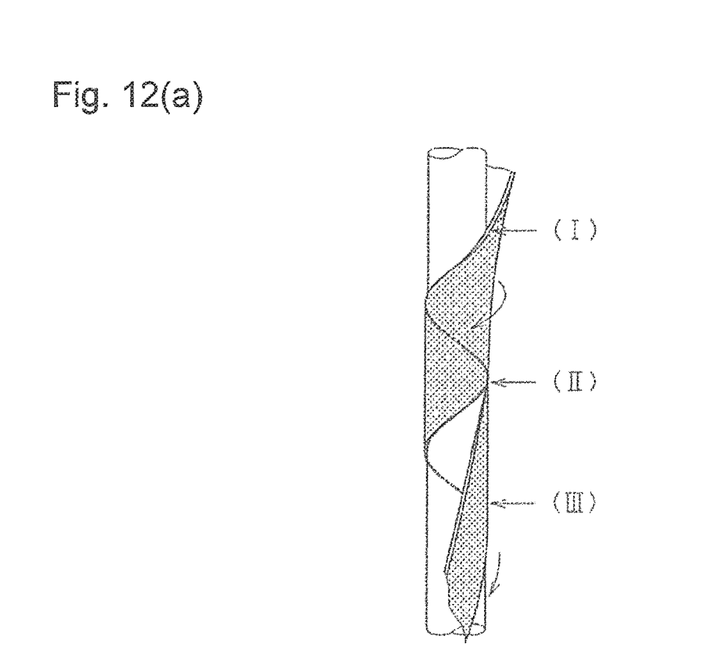
FIG. 12(a) is a schematic perspective view that shows measuring points of a pressure distribution in the belt winding pressure contact test.
Figure 12B:
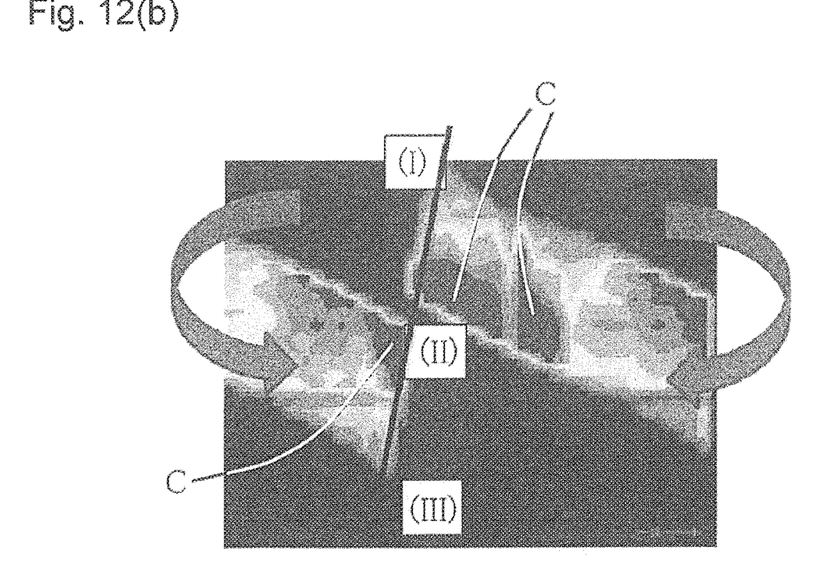
FIG. 12(b) is a diagram that shows an example of measurement results.

The pressure distribution was measured in a range from an entrance part (I) of the belt 23 into the pseudo paper tube 21, via an intermediate part (II), to a delivery part (III) as shown in FIG. 12(a). An example of the measured pressure distribution states was shown in FIG. 12(b). FIG. 12(b) shows that dark color parts C in the belt 23 indicate high pressure contact portions and the pressure decreases as the color becomes lighter.

<Modulus of Elasticity in Tension>

A modulus of elasticity in tension was measured according to JIS L 1096. The modulus of elasticity in tension is generally obtainable from the following equation according to Hooke's Law by drawing an auxiliary line to a proportional limit of a stress-strain curve.

$$E=\sigma/\varepsilon$$

(E denotes a modulus of elasticity in tension (MPa), σ denotes tensile strength σ of proportional limit (Mpa), and ε denotes strain of proportional limit.)

The tensile strength of the proportional limit and the strain ε of the proportional limit in each of the materials were found from an elongation rate range of 0-0.50 of the stress-strain curve obtained by a tensile test.

<Attached Belt Tension>

When conducting the winding pressure contact test, as shown in FIG. 10, a tension of the endless flat belt 23 was measured by attaching a sonic belt tension meter (product name "U-508," manufactured by Gates Unitta Asia Company) to a position indicated by reference letter M in FIG. 10, in a state in which the belt 23 was twisted and wound around the pseudo paper tube 21, and then entrained and stretched between the pulleys 22 and 22.

Figure 13:
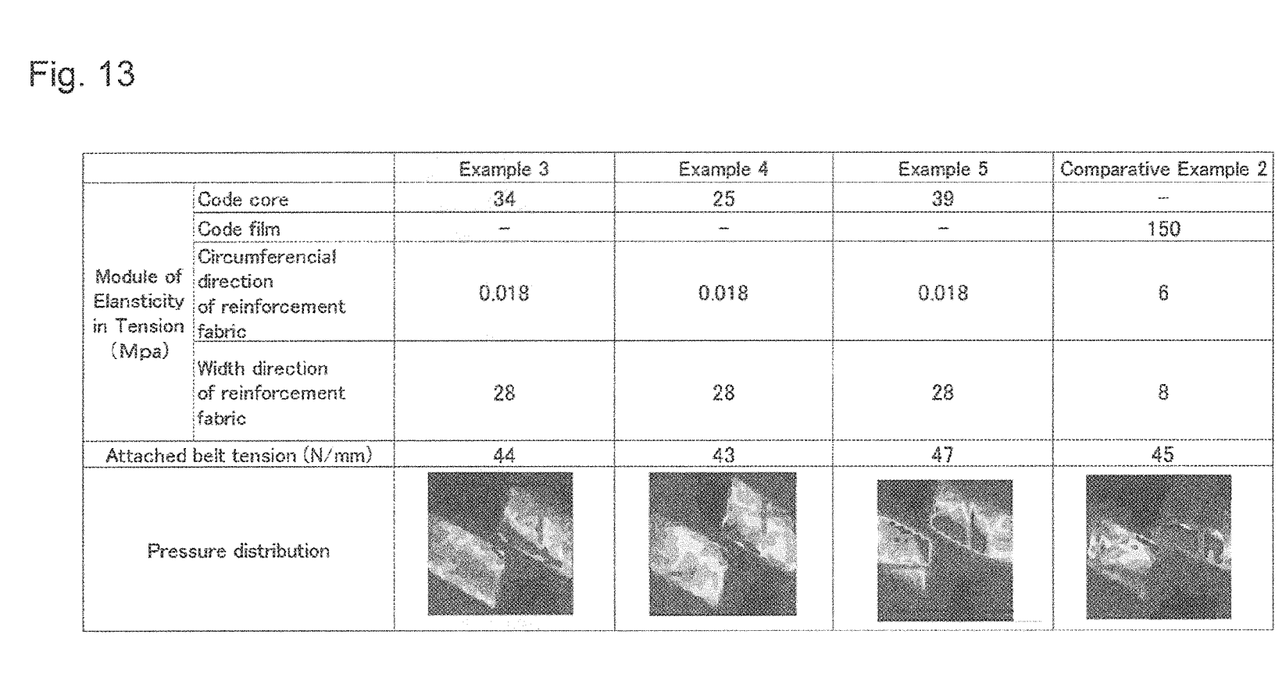
FIG. 13 is a diagram that shows test results of examples and comparative examples.

These test results are shown in FIG. 13. As can be seen from FIG. 13, in Comparative Example 2, a large number of high pressure contact portions indicated by the dark color exist on the entrance side of the belt, and the winding pressure is not equalized as a whole. In contrast, Examples 4 to 6 have less high pressure contact portions, and the winding pressure is equalized as a whole.

INDUSTRIAL APPLICABILITY

The endless flat belt according to the present embodiment is suitable for the use for the paper tube winding machine that causes the belt to be twisted, traveled, and wound.

DESCRIPTION OF THE REFERENCE NUMERAL

1: inner rubber layer
2: reinforcement fabric
3: surface rubber layer
4: finger joint shape
4a: convex part
4b: concave part
15: endless flat belt
16: endless flat belt
17: endless flat belt
10a, 10b: sewing thread
11: cord core
20: laminate body
21: pseudo paper tube
22: pulley
23: endless flat belt

The invention claimed is:

1. An endless flat belt for paper tube winding, comprising:
an inner rubber layer;
a cord core buried in the inner rubber layer and spirally wound at a predetermined pitch in a width direction of the belt; and
a reinforcement fabric stuck to the inner rubber layer,
wherein the cord core comprises polyamide fiber of polyamide 6, polyamide 66, polyamide 46, polyamide 11, polyamide 12, or polyamide 610,
wherein the reinforcement fabric, whose opposite ends are connected with each other into an endless form by adhesion or sewing, has elasticity in a circumferential direction of the belt and retains rigidity in a width direction of the belt,
wherein a modulus of elasticity in tension of the cord core is 10-200 MPa, a modulus of elasticity in tension of the reinforcement fabric in a circumferential direction of the belt is 0.001-5 MPa, and a modulus of elasticity in tension of the reinforcement fabric in the width direction of the belt is 10 MPa or more, and
wherein the cord core is configured so that an S-twisted cord core and a Z-twisted cord core are arranged alternately in the width direction of the reinforcement fabric.

2. The endless flat belt according to claim 1,
wherein one end part of the reinforcement fabric has a convex part protruding in a longitudinal direction of the belt, and another end part of the reinforcement fabric has a concave part having a shape corresponding to the convex part, and
wherein the convex part is disposed within and adhered to the concave part.

3. The endless flat belt according to claim 1, wherein the opposite ends of the reinforcement fabric are connected with each other together with the inner rubber layer by adhesion or sewing in a state in which the inner rubber layer is laminated on one surface of the reinforcement fabric.

4. The endless flat belt according to claim 1, wherein a surface rubber layer is stuck to a surface of the inner rubber layer to which the reinforcement fabric is not stuck, or to a surface of the reinforcement fabric which is opposite a surface thereof stuck to the inner rubber layer.

5. The endless flat belt according to claim 1, wherein the reinforcement fabric has a surface rubber layer stuck to a surface of the reinforcement fabric which is opposite a surface thereof stuck to the inner rubber layer, and the reinforcement fabric and the surface rubber layer are sequentially laminated on both surfaces of the inner rubber layer having the cord core buried therein so as to have symmetry around the cord core.

6. The endless flat belt according to claim 1, wherein a surface of the surface rubber layer is provided with a fine concave-convex shape.

7. The endless flat belt according to claim 1, wherein a thread material of the reinforcement fabric in the circumferential direction of the belt is a processed thread having elasticity or an elastic thread.

8. The endless flat belt according to claim 6, wherein the surface rubber layer has a thickness of 0.1-10 mm.

9. An endless flat belt for paper tube winding, comprising:
an inner rubber layer;
a cord core buried in the inner rubber layer and spirally wound at a predetermined pitch in a width direction of the belt; and
a reinforcement fabric stuck to the inner rubber layer,
wherein the cord core consists of one of a polyamide fiber of polyamide 6, polyamide 66, polyamide 46, polyamide 11, polyamide 12, or polyamide 610,
wherein the reinforcement fabric, whose opposite ends are connected with each other into an endless form by adhesion or sewing, has elasticity in a circumferential direction of the belt and retains rigidity in a width direction of the belt,
wherein a modulus of elasticity in tension of the cord core is 10-200 MPa, a modulus of elasticity in tension of the reinforcement fabric in a circumferential direction of the belt is 0.001-5 MPa, and a modulus of elasticity in tension of the reinforcement fabric in the width direction of the belt is 10 MPa or more, and
wherein the cord core is configured so that an S-twisted cord core and a Z-twisted cord core are arranged alternately in the width direction of the reinforcement fabric.

* * * * *